W. WRIGHT.
AGRICULTURAL IMPLEMENT.
APPLICATION FILED NOV. 20, 1907.
916,087.
Patented Mar. 23, 1909.
3 SHEETS—SHEET 1.
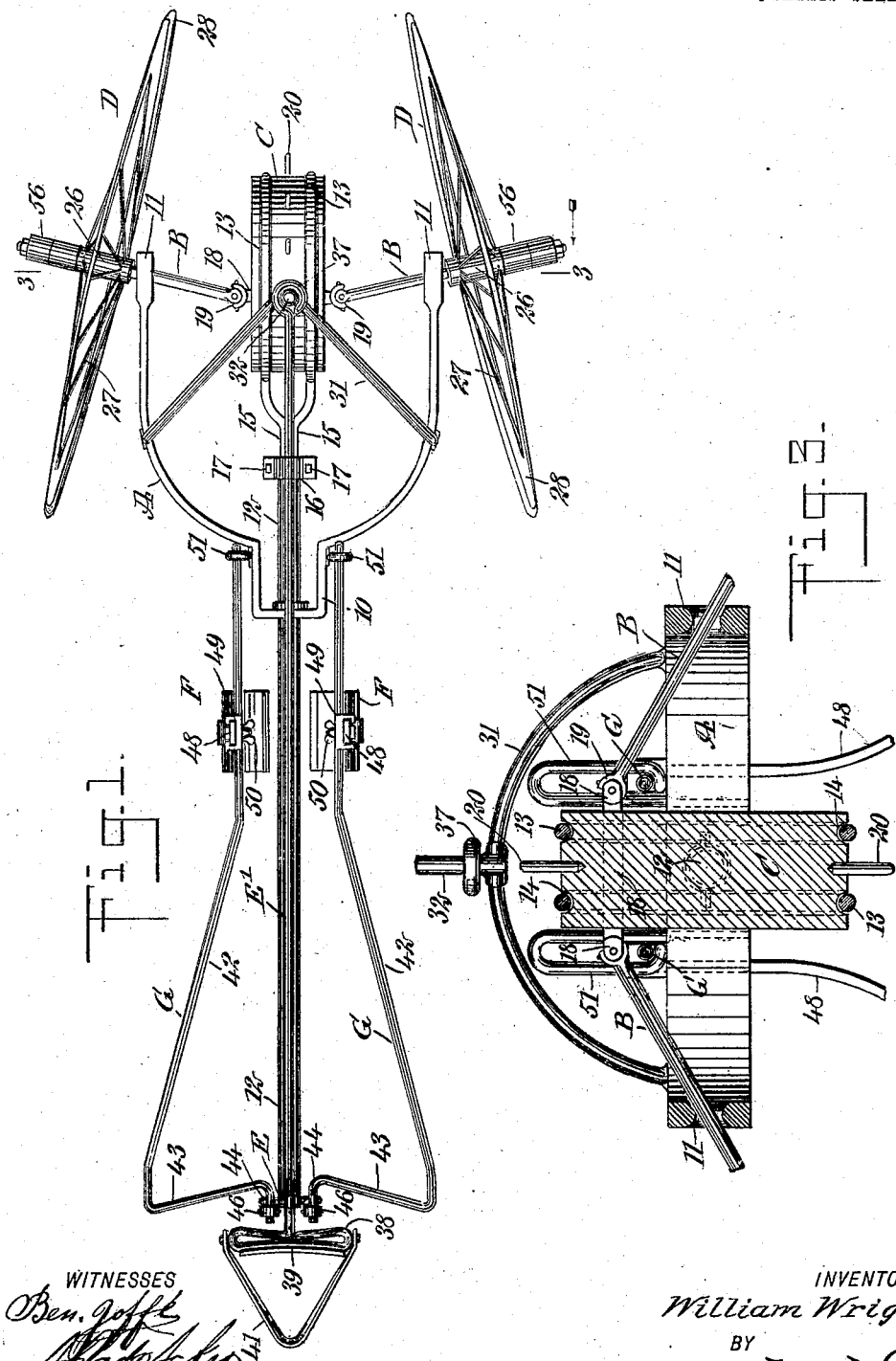
WITNESSES
INVENTOR
William Wright
BY
ATTORNEYS W. WRIGHT.
AGRICULTURAL IMPLEMENT.
APPLICATION FILED NOV. 20, 1907.
916,087.
Patented Mar. 23, 1909.
3 SHEETS—SHEET 2.
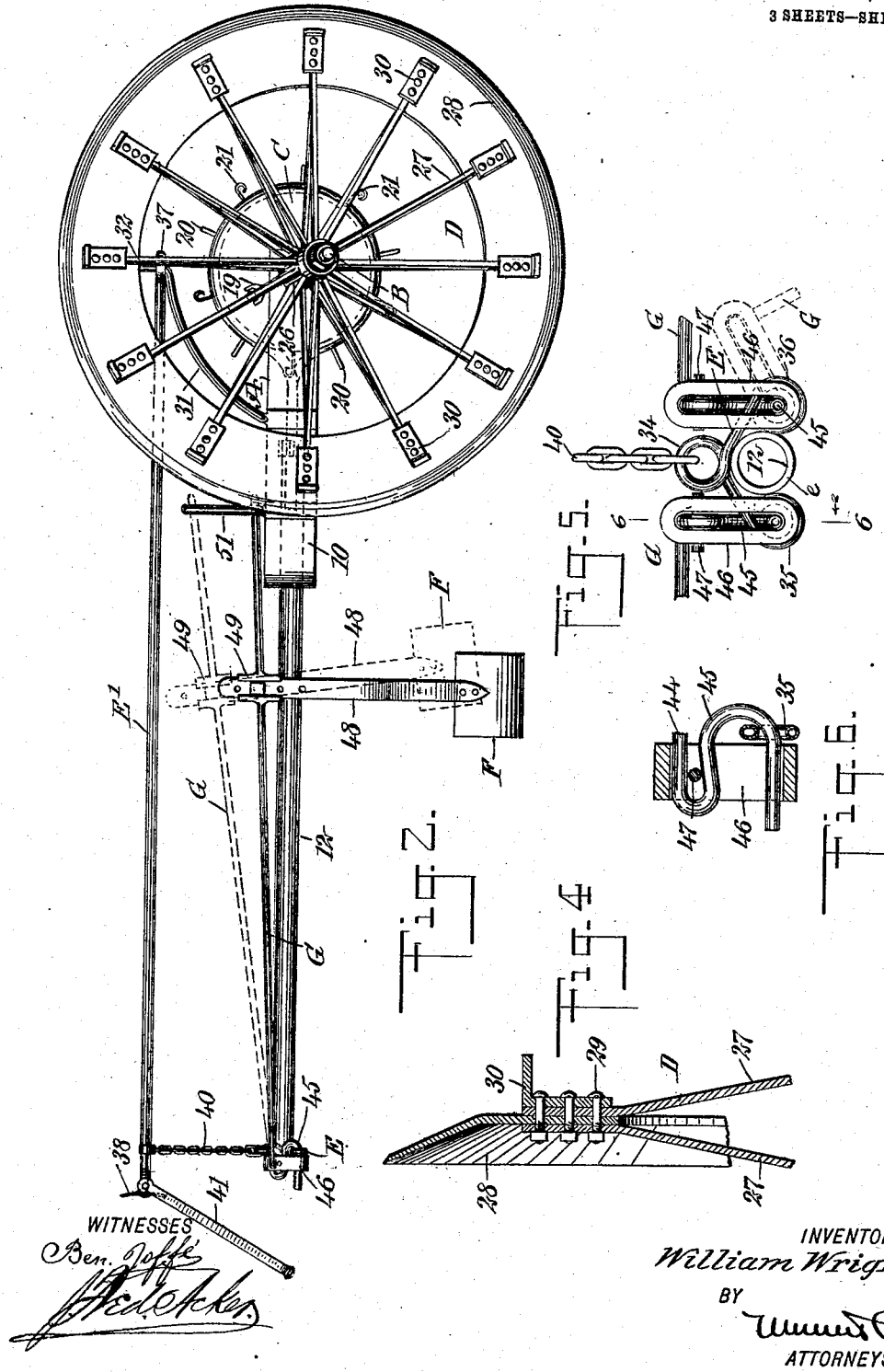
WITNESSES
INVENTOR
William Wright
BY
ATTORNEYS W. WRIGHT.
AGRICULTURAL IMPLEMENT.
APPLICATION FILED NOV. 20, 1907.
916,087.
Patented Mar. 23, 1909.
3 SHEETS—SHEET 3.
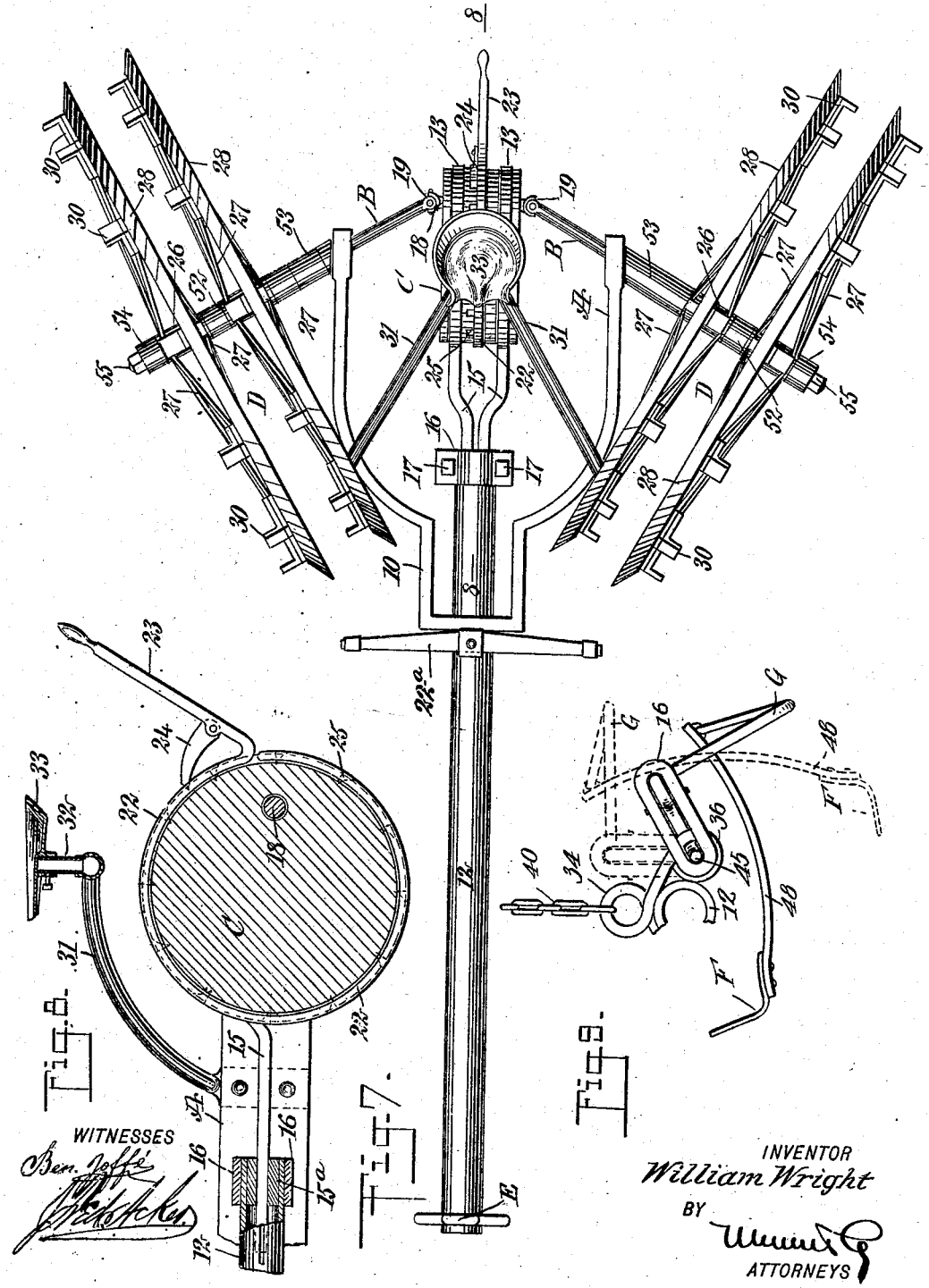
WITNESSES
INVENTOR
William Wright
BY
ATTORNEYS

UNITED STATES PATENT OFFICE.

WILLIAM WRIGHT, OF BROOKSIDE, ALABAMA, ASSIGNOR OF ONE-HALF TO DOLPHUS M. HALL, OF BROOKSIDE, ALABAMA.

AGRICULTURAL IMPLEMENT.

No. 916,087.　　　　　Specification of Letters Patent.　　　Patented March 23, 1909.

Application filed November 20, 1907. Serial No. 403,011.

*To all whom it may concern:*

Be it known that I, WILLIAM WRIGHT, a citizen of the United States, and a resident of Brookside, in the county of Jefferson and State of Alabama, have invented new and useful Improvements in Agricultural Implements, of which the following is a full, clear, and exact description.

The purpose of the invention is to provide an agricultural implement that may be used as a cotton chopper and also as a field or garden hoe, capable in light or garden work of being pushed by the operator without interfering with the free use of the hands, and which when used for field or heavy work can be drawn by one or more draft animals.

Another purpose of the invention is to provide a machine of the type mentioned, that will be comparatively light of draft and so constructed that one individual in the use of the machine can perform much more work in a given time and under the same conditions, than can be accomplished in the use of the majority of machines intended for the same purpose.

It is also a purpose of the invention to provide an implement wherein the hoes are so arranged that they may be made to operate at any time and at any point across the drill, and wherein the hoes are elevated as they are drawn back to make another stroke, thus in their operation, the hoes do not injure the plants left standing.

A further purpose of the invention is to provide a machine with disk cultivators, singly or in sets, and means conveniently and quickly operated for regulating the angle of the axles for the disks relatively to the path of travel of the machine.

The invention consists in the novel construction and combination of the several parts as will be hereinafter fully set forth and pointed out in the claims.

Reference is to be had to the accompanying drawings forming a part of this specification in which similar characters of reference indicate corresponding parts in all the figures.

Figure 1 is a plan view of the machine adapted particularly for garden use; Fig. 2 is a side elevation of the machine illustrated in Fig. 1; Fig. 3 is an enlarged transverse section taken practically on the line 3—3 of Fig. 1; Fig. 4 is an enlarged diametrical section through one of the disks employed; Fig. 5 is a rear end view of the tongue and parts carried thereby at such point; Fig. 6 is a detail section taken practically on the line 6—6 of Fig. 5; Fig. 7 is an enlarged plan view of the machine when constructed for use in the field as a cultivator only; Fig. 8 is an enlarged vertical section taken practically on the line 8—8 of Fig. 7; and Fig. 9 is a rear end view showing the parts carried at the end of the tongue at one side thereof and also one of the hoes.

The main frame A of the machine is horizontal and is practically U-shaped, being provided at its bow portion with an extension 10 preferably more or less rectangular, as illustrated, and at the end portions of the main frame A, bearings 11 are formed and these bearings are produced by forming opposing apertures in the side members of the said frame, as is shown in Fig. 3, the walls of which apertures are curved, or each rounded out at both side faces of the frame. These apertures or bearings 11 are adapted to receive axles B, and the peculiar formation is given to said bearings to admit of the said axles being given a downward inclination, or an inclination in direction of either end of the frame together with the downward inclination. A tubular tongue 12 which is longitudinally slitted at its inward end is passed through the extension 10 of the main frame A into its body portion, and in front of the inwardly extending end of the said tongue, a wheel C is located, adapted for shifting the positions of the axles B. This wheel C, as is best shown in Figs. 1 and 3, is supported in ring bearings 13 that are received in peripheral grooves 14 located one at each side of the center of the wheel, and these ring bearings have sufficient frictional engagement with the said wheel C to prevent its being accidentally carried from adjusted position. The ring bearings 13 are provided with arms 15, and these arms are carried through a thimble 15ª in the entering end of the tongue 12, as is illustrated in Fig. 8, and the said arms 15 are held firmly within the said tongue by means of a clamp consisting of upper and lower members 16 that engage the corresponding exterior portions of the tongue, which members are drawn together by bolts 17, or the equivalents thereof, as is shown best in Figs. 1 and 7. A coupling pin 18 is loosely and eccentrically passed through the shifting wheel C, as is shown in Figs. 1 and 8, and the ends of this coupling pin extend beyond the sides of the shifting wheel C and have a universal connection 19 with the axles B, as is illustrated in Figs. 1, 3, and 7.

When the machine is constructed for light work, that is to say when it is to be drawn by a single draft animal, or is to be pushed forward by an individual, pins 20 are located at the central portion of the periphery of the wheel whereby to turn the same in its bearings, and between these pins, hooks 21 are located, as is shown in Fig. 2, and a swingletree is attached to the most convenient hook in the line of draft. When, however, the machine is to be constructed for heavy work, as is illustrated in Fig. 7, a band 22 is loosely mounted on the said wheel between its ends, and the said band is provided with a lever 23 that carries a dog 24, and the said dog as the lever is moved and the band is turned, enters recesses 25 in the wheel C and revolves the said wheel to the desired extent; the lever 23 is within convenient reach from the driver's seat, and in this form of the machine, a draft tree 22$^a$ is located on the extension 10 of the main frame A.

Each axle B is adapted to carry outside of the main frame A, one or more cultivating disks D; these cultivating disks are in the form of wheels, each comprising a hub 26 and spokes 27 that extend from opposite ends of the hub, the opposing spokes being brought quite close together at their outer ends, and receiving between them an inwardly dished rim 28, the peripheral edge whereof is more or less sharpened, as is illustrated in Fig. 4, and the spokes are secured to this dished rim 28 by means of bolts 29, and the same bolts also serve to hold angular stops 30 in engagement with the outer spokes of a disk, as is also shown in Fig. 4, preferably in an adjustable manner, and the horizontal members of these stops 30 engage with the ground as the disk revolves and serve to limit the extent to which the dished rim can enter the ground. An upwardly arched frame 31 is secured to the main frame A, and this frame 31 is carried over the shifting wheel C, as is particularly shown in Figs. 2 and 8, and at the central portion of the frame 31, a post 32 is carried upward and the driver's seat 33 is adjustably secured on this post when the form of machine shown in Fig. 7 is employed.

A hanger E is secured by clip e to that end of the tongue 12 that is farthest removed from the cultivating disks D; this hanger is not needed for the form of the device shown in Fig. 7, but is very important when the machine or device is constructed as is illustrated in Fig. 1, and preferably the hanger E is constructed as illustrated in Fig. 5, wherein it is somewhat triangular in shape and is provided with an eye 34 that is above the tongue 12, and lower eyes 35 and 36, one at each side of the tongue. When the machine is built to be pushed by an individual, a push rod E' is provided, and this push rod at one end has an eye 37 formed therein that receives the post 32 of the frame 31, and the said push rod E' at its opposite or rear end is provided with a quite long horizontal handle 38, being at an angle to the rod proper, as is best shown in Fig. 1, and this handle 38 is provided at its rear longitudinal portion with a pad 39, since the person pushing the machine or device will press his chest against the pad, and a chain 40, or the equivalent thereof, is carried down from the handle portion of the push rod E' and is fastened at the upper eye 34 of the hanger E, as is best shown in Fig. 5. In this manner the push rod E' is connected with the tongue 12, and when the push rod is held up the tongue is also held in its normal or horizontal position, illustrated particularly in Fig. 2, and in order that both hands of the operator shall be free, a strap 41 is attached to the handle 38 of the push rod, which is adapted to be passed over the neck of the operator.

Opposing hoes F are operated by hand, through the medium of opposing rocking and pivotally mounted arms G, which arms are located one at each side of the tongue, as is best shown in Fig. 1. Each arm consists of a straight forward end portion that is parallel with the tongue, and this straight portion ceases at or about a central point between the ends of an arm, and from said point each arm is carried horizontally outward and rearward at an inclination to its rear portion, as is illustrated at 42 in Fig. 1, and is provided with a handle member 43 at its rear end that is carried in direction of the tongue, and this handle member 43 has a rearwardly extending horizontal member 44 extending from it, the construction of each of these arms being the same; and below each rearwardly extending horizontal member 44, an S-shaped extension 45 is formed, as is shown best in Fig. 6, the said extension or rear terminal 45 of the arm G being made to extend downward and in direction of either the eye 35 or the eye 36 of the hanger E. The lower ends of the S-extensions 45 of the arms G are passed, one through the eye 35 and the other through the eye 36 and are free to rock and swing therein. Each S-extension is secured in a chambered weight 46 of loop formation by a pin 47 or its equivalent. The hoes F are preferably placed opposite each other, and are given an inward inclination or curvature, or a curvature in direction of each other, and each hoe is attached to the lower end of a shank 48, and each shank 48 is adjustably passed through a clip 49 that may be fast or adjustable upon an arm G, as is shown in Figs. 1 and 2, and the shanks are held in the said clips by set screws 50, or like devices; thus it will be observed that the hoes may be made to enter the ground to a greater or lesser degree. These hoes may be worked concertedly, or may be operated one independent of the other, and they may be used for removing weeds from the ground as well as for removing surplus plants from a drill. When the hoes are not in use, they are above the surface of the ground as shown most clearly in Fig. 9, so as not to engage with the plants as the machine is pushed or drawn along, and the said hoes are held in this position by the weights 46, the arm G at this time assuming the position shown in full lines in Fig. 9 and dotted lines Fig. 5.

The forward ends of the arms G have rocking and vertical movement in order that the arms when rocked in one direction will carry the hoes in a position to dig into the ground, and when rocked in an opposite direction they will carry the hoes away from the ground, and the rear portion of the arms will be lifted up or elevated as shown in dotted lines in Fig. 1 as the hoes are carried from working position, thus preventing the hoes when being carried upward from interfering with plants left standing. To that end I provide loop guides 51 for the rear ends of the said arms G, which guides are not needed when the machine is used for cultivating purposes only, and therefore these loops 51 are removably attached to the frame A at each side of its extension 10.

To operate the hoes, they being above the ground as shown in full lines Fig. 9, the handle portions 43 of the rods G are grasped and first rocked upward to cause the hoes to assume the position shown in dotted lines in Fig. 9, and then rocked downward when the hoes will enter the ground and remove the weeds or plants. In the rocking movements of the rods G, their front ends play up and down in the guides 51, so as to permit the hoes to readily enter and leave the ground as before described. The up and down movement of the front ends of the rods is facilitated by the weights 46, which partially counterbalance the said rods.

In Fig. 1 I have illustrated but one cultivator disk on each axle, whereas in Fig. 7 I have illustrated two on each of said axles, and their number may be increased if desired. When two or more disks are employed, they are separated by sleeves 52 that are loose on the axle, and other sleeves 53 are located between the inner hubs of the inner cultivator disks and the outer faces of the frame A, and according to the length of these latter sleeves 53 will the disks be removed from the frame, and other sleeves 54 are employed to space the outer disks from the nuts 55 on the ends of the axle.

In the form of device shown in Fig. 1, sleeves 56 are employed, also for spacing the disks D from the frame A. The axles have always a downward inclination in opposite directions to a greater or lesser extent, and by the manipulation of the shifting wheel C the axles will be given an inclination to a greater or lesser degree in direction of either end of the frame A, but in operation the disks D are made to converge in direction of the travel of the machine. It is also evident that either hoe may be operated at any time that occasion may demand, being under the complete control of the operator. The machine travels in one direction, if drawn by two or more horses, and if pushed, it travels in the opposite direction, the position of the disks being changed to suit.

Having thus described my invention, I claim as new and desire to secure by Letters Patent,—

1. In an agricultural implement, a frame, axles loosely mounted in the frame, cultivator disks on the outer ends of the axles, and an eccentric with which the inner ends of the axles are connected.

2. In an agricultural implement, a frame, axles loosely mounted in the frame, an eccentrically mounted member having universal connections with the inner ends of the axles, and cultivator disks on the outer ends of the axles outside of the frame.

3. In an agricultural implement, a frame, axles loosely mounted in the frame, a coupling pin having universal connections with the inner ends of the axles, an eccentric support for the pin, and cultivator disks on the outer ends of the axles outside of the frame.

4. In an agricultural machine, a frame, axles mounted for shifting movement relatively to the said frame, a wheel supported by the frame, a coupling for the axles eccentrically carried by the said wheel, and means for controlling the rotation of the wheel.

5. In an agricultural machine, a frame, axles mounted for shifting movement relatively to said frame, a shifting wheel supported in the frame between the axles, a coupling member eccentrically mounted in said shifting wheel, and having universal connection with the axles, and means for controlling the movement of the said shifting wheel.

6. In an agricultural machine, a frame, axles mounted for shifting movement relatively to said frame, a shifting wheel supported in the frame between the axles, a coupling member eccentrically mounted in said shifting wheel and having universal connection with the axles, and means for controlling the movement of the said shifting wheel, and cultivator disks loosely mounted upon said axles.

7. In an agricultural machine, a frame, axles mounted for shifting movement relatively to said frame, a shifting wheel supported in the frame between the axles, a coupling member eccentrically mounted in said shifting wheel and having universal connection with the axles, means for controlling the movement of the said shifting wheel, and cultivator disks loosely mounted upon said axles, devices carried by said disks for limiting the extent to which they shall enter the ground, and means for pushing and means for pulling the disk-carrying frame over the surface of the ground.

8. In an agricultural implement, a support, a manually operated rocking and swinging arm mounted at its ends in the support, and a hoe carried by the arm intermediate of its ends.

9. In an agricultural implement, a support, a manually operated rocking and swinging arm mounted at its ends in the support, a hoe, and means for adjustably mounting the hoe on the arm intermediate of its ends.

10. In an agricultural implement, a support, a manually operated rocking and swinging arm mounted at its ends in the support, a hoe having a shank, and a clip adjustably secured upon the arm and in which the shank of the hoe is adjustably secured.

11. In an agricultural implement, a support, an arm mounted to rock upon said support, being free at one of its ends, whereby as the said arm is rocked the said free end may be raised, and a hoe having its shank secured to the arm intermediate of its ends.

12. In an agricultural implement, the combination with a wheeled support, of an arm mounted for rocking movement upon the said support, being free at one of its ends, a guide for the free end of the arm, a counter-balanced weight for the opposing end of the arm, and a hoe carried by said arm between its ends.

13. In an agricultural implement, the combination with a wheeled support including an arm, axles mounted for shifting movement in the frame, and cultivator disks loosely mounted on the said axles, a device supported by the said frame, and connections between said device and axles for imparting to the axles different inclinations in different directions, of a tongue secured to the said frame, a push bar extending from the frame to the rear of the said tongue, arms pivoted at opposite sides of the said tongue at their rear ends, their free ends being adapted for vertical movement, guides for the free ends of the said arms, counterbalance weights at the pivoted portions of the said arms, a connection between the push bar and the tongue, and a loop extending from the rear end of the push bar adapted to be passed over the head of the operator of the machine.

14. In an agricultural implement, the combination of a wheel supported frame, a tongue, arms mounted to rock at opposite sides of the tongue independently of one another, and hoes carried by the arms intermediate of their ends.

15. In an agricultural implement, the combination of a wheel-supported frame, a tongue, arms at opposite sides of the tongue, means for mounting the arms whereby they are free to rock and swing, and hoes carried by the arms.

16. In an agricultural implement, the combination of a wheel-supported frame having guide loops, a tongue having eyes at its ends, arms mounted in the eyes and guide loops and provided with handles, and hoes carried by the rods intermediate of their ends.

17. In an agricultural implement, the combination of a wheel-supported frame having guide loops, a tongue having eyes at its ends, arms mounted in the eyes and guide loops and provided with handles, weights on the arms adjacent to the eyes, and hoes carried by the arms intermediate of their ends.

In testimony whereof I have signed my name to this specification in the presence of two subscribing witnesses.

WILLIAM WRIGHT.

Witnesses:
DAVID McDONALD,
ABRAHAM JONES.